United States Patent
Sousa et al.

[11] Patent Number: 5,990,925
[45] Date of Patent: Nov. 23, 1999

[54] DIODE-PUMPED SYSTEM AND METHOD FOR PRODUCING IMAGE SPOTS OF CONSTANT SIZE

[75] Inventors: John G. Sousa, Hudson; Josh Foster, Nashua, both of N.H.; James R. Moss, Altamonte Springs, Fla.

[73] Assignee: Presstek, Inc., Hudson, N.H.

[21] Appl. No.: 08/966,492

[22] Filed: Nov. 7, 1997

[51] Int. Cl.[6] ................................ H01S 3/091
[52] U.S. Cl. ................ 347/256; 347/258; 372/70; 372/71; 372/41
[58] Field of Search .................. 347/258, 256; 372/21, 36, 38, 39, 70, 71, 41

[56] References Cited

U.S. PATENT DOCUMENTS

| | | | |
|---|---|---|---|
| 3,284,722 | 11/1966 | Gray | 331/94.5 |
| 4,185,891 | 1/1980 | Kaestner | 372/9 |
| 4,440,470 | 4/1984 | Khoe | 385/49 |
| 4,812,005 | 3/1989 | Heywang | 385/27 |
| 4,865,409 | 9/1989 | Althaus et al. | 385/49 |
| 4,890,289 | 12/1989 | Basu et al. | 372/33 |
| 4,945,544 | 7/1990 | Tanaka et al. | 372/70 |
| 4,979,791 | 12/1990 | Bowen et al. | 385/33 |
| 5,080,706 | 1/1992 | Snyder et al. | 65/102 |
| 5,081,639 | 1/1992 | Snyder et al. | 372/101 |
| 5,155,631 | 10/1992 | Snyder et al. | 359/708 |
| 5,196,866 | 3/1993 | Ferschl et al. | 347/242 |
| 5,245,618 | 9/1993 | Masuda et al. | 372/22 |
| 5,278,851 | 1/1994 | Goto | 372/19 |
| 5,303,250 | 4/1994 | Masuda et al. | 372/38 |
| 5,331,650 | 7/1994 | Maeda et al. | 372/26 |
| 5,351,617 | 10/1994 | Williams et al. | 101/467 |
| 5,410,559 | 4/1995 | Nighan, Jr. et al. | 372/19 |

OTHER PUBLICATIONS

Mingxin et al., *Applied Optics*, 32:2085–2086 (1993).
Zayhowski et al., *Optic Letters*, 14: 1318–1320 (1989).
Zayhowski et al, *Optic letters*, 16: 575–577 (1991).
Zayhowski et al., *Optic letters*, 17:1201–1203 (1992).
Lacovara et al., *Optic Letters*, 16: 1089–1091 (1991).
Chen et al., *Optics Letters*, 18: 1418–1419 (1993).
Zhou et al., *Optics Letters*, 18:511–512 (1993).
Li et al., *Optics Letters*, 18: 203–204 (1993).
Fan, *IEEE Journal of Quantum Electronics*, 29: 1457–1459 (1992).
Zayhowski et al., *Optics Letters*, 19:1427–1429 (1994).
Taira et al., *Optics Letters*, 16: 1955–1957 (1991).
Robrish, *Optics Letters*, 19: 813–815 (1994).
Longhi, *J. Opt. Soc. Am B.*, 11: 1098–1107 (1994).
MacKinnon et al., *Optics Communications 94*, 94: 281–288 (1992).
Fan, *Journal of Quantum Electronics*, 29: 1457–1459 (1993).

*Primary Examiner*—N. Le
*Assistant Examiner*—Hai C. Pham
*Attorney, Agent, or Firm*—Cesari and McKenna, LLP

[57] ABSTRACT

Pumped laser crystals for use in an imaging apparatus are designed and housed so as to minimize variation in dot size across the spectrum of duty cycles ranging generally from 1% to 100%—that is, from print densities ranging from every hundredth pixel to every consecutive pixel.

27 Claims, 17 Drawing Sheets

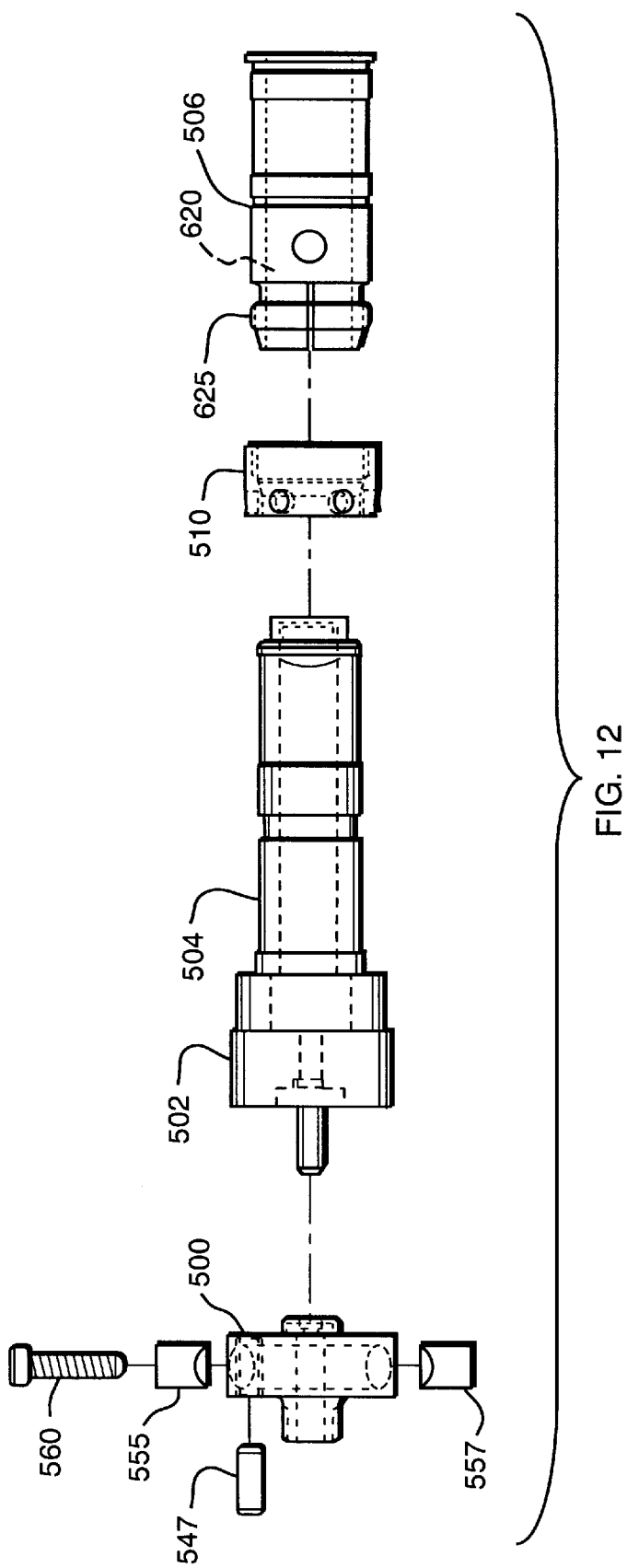

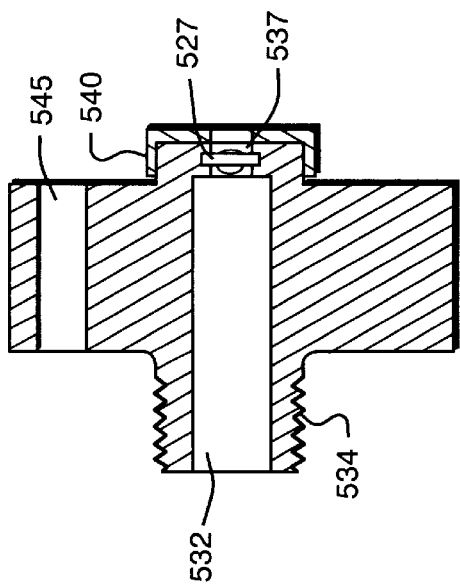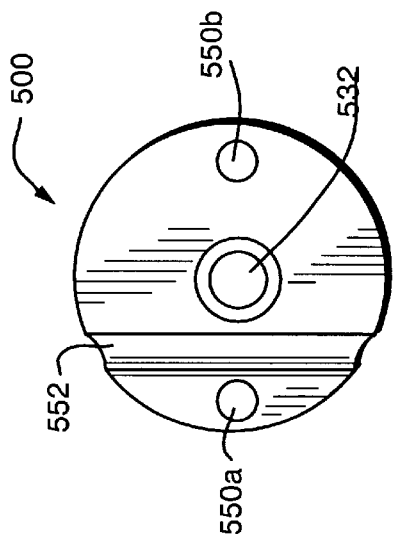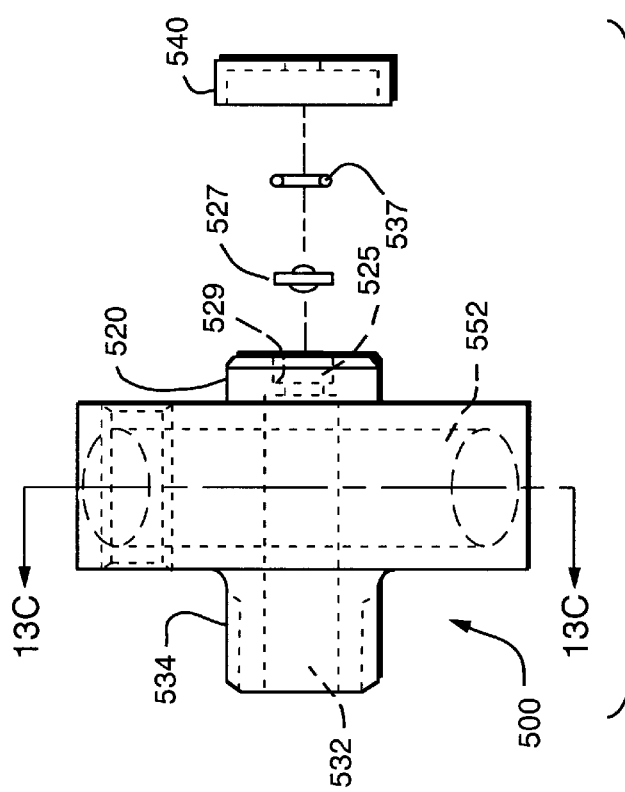

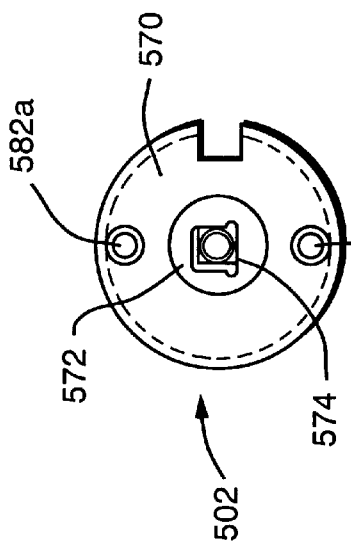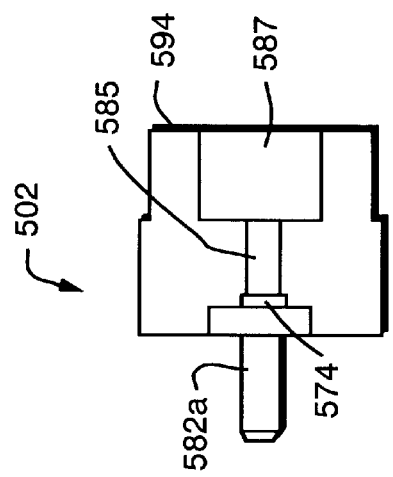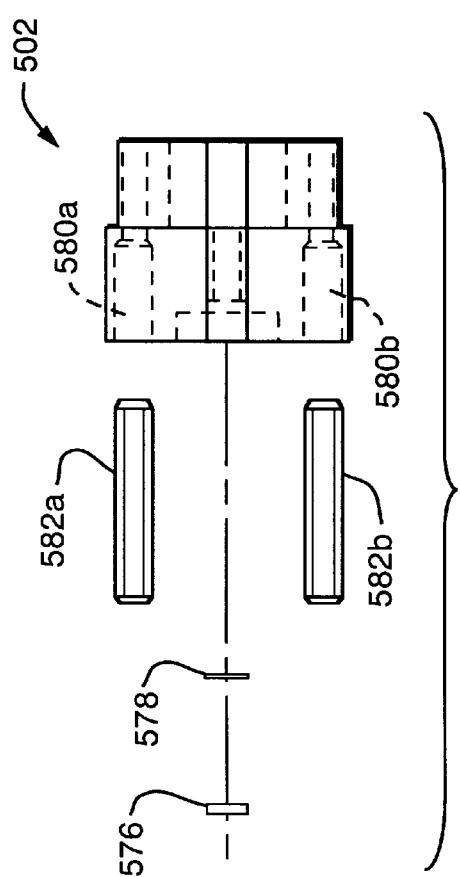

DIODE-PUMPED SYSTEM AND METHOD FOR PRODUCING IMAGE SPOTS OF CONSTANT SIZE

BACKGROUND OF THE INVENTION

1. Field of the Invention

The present invention relates to digital printing apparatus and methods, and more particularly to a system for imaging lithographic printing members on- or off-press using digitally controlled laser output.

2. Description of the Related Art

In offset lithography, a printable image is present on a printing member as a pattern of ink-accepting (oleophilic) and ink-repellent (oleophobic) surface areas. Once applied to these areas, ink can be efficiently transferred to a recording medium in the imagewise pattern with substantial fidelity. Dry printing systems utilize printing members whose ink-repellent portions are sufficiently phobic to ink as to permit its direct application. Ink applied uniformly to the printing member is transferred to the recording medium only in the imagewise pattern. Typically, the printing member first makes contact with a compliant intermediate surface called a blanket cylinder which, in turn, applies the image to the paper or other recording medium. In typical sheet-fed press systems, the recording medium is pinned to an impression cylinder, which brings it into contact with the blanket cylinder.

In a wet lithographic system, the non-image areas are hydrophilic, and the necessary ink-repellency is provided by an initial application of a dampening (or "fountain") solution to the plate prior to inking. The ink-abhesive fountain solution prevents ink from adhering to the non-image areas, but does not affect the oleophilic character of the image areas.

If a press is to print in more than one color, a separate printing member corresponding to each color is required. The original image is decomposed into a series of imagewise patterns, or "separations," that each reflect the contribution of the corresponding printable color. The positions of the printing members are coordinated so that the color components printed by the different members will be in register on the printed copies. Each printing member ordinarily is mounted on (or integral with) a "plate" cylinder, and the set of cylinders associated with a particular color on a press is usually referred to as a printing station.

To circumvent the cumbersome photographic development, plate-mounting and plate-registration operations that typify traditional printing technologies, practitioners have developed electronic alternatives that store the imagewise pattern in digital form and impress the pattern directly onto the plate. Plate-imaging devices amenable to computer control include various forms of lasers. For example, U.S. Pat. Nos. 5,351,617 and 5,385,092 disclose ablative recording systems that use low-power laser discharges to remove, in an imagewise pattern, one or more layers of a lithographic printing blank, thereby creating a ready-to-ink printing member without the need for photographic development. In accordance with those systems, laser output is guided from the diode to the printing surface and focused onto that surface (or, desirably, onto the layer most susceptible to laser ablation, which will generally lie beneath the surface layer). Other systems use laser energy to cause transfer of material from a donor to an acceptor sheet, to record non-ablatively, or as a pointwise alternative to overall exposure through a photomask or negative.

As discussed in the '617 and '092 patents, laser output can be generated remotely and brought to the recording blank by means of optical fibers and focusing lens assemblies. It is important, when focusing radiation onto the recording blank, to maintain satisfactory depth-of-focus—that is, the tolerable deviation from perfect focus on the recording surface. Adequate depth-of-focus is important to construction and use of the imaging apparatus; the smaller the working depth-of-focus, the greater will be the need for fine mechanical adjustments and vulnerability to performance degradation due to the alignment shifts that can accompany normal use. Depth-of-focus is maximized by keeping output beam divergence to a minimum.

Unfortunately, optical efforts to reduce beam divergence also diminish power density, since a lens cannot alter the brightness of the radiation it corrects; a lens can only change the optical path. Thus, optical correction presents an inherent tradeoff between depth-of-focus and power loss. U.S. Ser. No. 08/676,470, filed on Jul. 8, 1996 and entitled DIODE-PUMPED LASER SYSTEM AND METHOD, discloses an approach that utilizes the divergent output of a semiconductor or diode laser to optically pump a laser crystal, which itself emits laser radiation with substantially less beam divergence but comparable power density; the laser crystal converts divergent incoming radiation into a single-mode output with higher brightness.

The output of the laser crystal is focused onto the surface of a recording medium to perform the imaging function. In ablation-type systems, the beam is focused on the "ablation layer" of the recording material, which is designed to volatilize in response to laser radiation; again, the depth-of-focus of the laser beam provides a degree of tolerable deviation. In transfer-type systems, the beam is focused on the transfer layer. As used herein, the term "plate" or "member" refers to any type of printing member or surface capable of recording an image defined by regions exhibiting differential affinities for ink and/or fountain solution; suitable configurations include the traditional planar or curved lithographic plates that are mounted on the plate cylinder of a printing press, but can also include seamless cylinders (e.g., the roll surface of a plate cylinder), an endless belt, or other arrangement.

Practical imaging equipment requires lasers that respond nearly instantaneously to high-frequency square-wave power pulses so that imaging dots—that is, the spots produced by the laser beam on the recording material—appear as sharp, discrete, and ordinarily round shapes of consistent size. Dots must also be printed, or recording space left blank, at very closely spaced intervals to achieve typical print resolutions. Although the '470 application discloses the ability to control image-dot size by varying the pulse width within certain limits, it has been found that dot size can also change with the density at which dots are printed. The term "duty cycle" refers to the percentage of pixel locations in an imaged field that actually receive laser radiation (that is, the frequency with which the laser crystal is activated). The larger the duty cycle, the darker will be the resulting color, since in digital printing systems gray-scale densities or tints are achieved by varying pixel densities.

If dot size varies with the duty cycle, it will be impossible to establish consistent calibrations for color densities, since dot size also affects density. For example, if dots are smaller at low duty cycles, areas imaged at low pixel densities will print lighter than would be expected. And since documents typically contain regions of varying densities that may be interwoven in complex patterns, the problem cannot be corrected simply by altering the pixel density to correct for varying dot sizes.

DESCRIPTION OF THE INVENTION

Brief Summary of the Invention

Through the use of novel mounting and tuning strategies, the present invention nearly eliminates variation in dot size across the spectrum of duty cycles (ranging generally from 1% to 100%—that is, from print densities spanning every hundredth pixel to every consecutive pixel). It should be stressed that the term "imaging" refers generally to permanent alteration to the affinity characteristics of a printing plate; in preferred implementations, imaging means ablation of a recording layer (in an ablation-type plate) or transfer of donor material to an acceptor sheet (in a transfer-type plate).

Although the preferred implementation of the invention involves laser imaging of lithographic printing members, it is usefully applied to a wide variety of laser-recording systems involving various different kinds of graphic-arts constructions.

The preferred implementation utilizes, as a pumping source, at least one laser device that emits in the IR, and preferably near-IR region, to image ablative printing members (as disclosed, for example, in the '617 and '092 patents, as well as in U.S. Pat. Nos. 5,339,737 and 5,379,698); or transfer-type printing members (as disclosed, for example, in U.S. Ser. No. 08/376,766, filed on Jan. 23, 1995 and entitled METHOD AND APPARATUS FOR LASER IMAGING OF LITHOGRAPHIC PRINTING MEMBERS BY THERMAL NON-ABLATIVE DISCHARGE). The pumping lasers are typically solid-state devices (commonly termed semiconductor lasers and typically based on gallium aluminum arsenide or gallium aluminum indium compounds); these are distinctly economical and convenient, and may be used in conjunction with a variety of recording media. The use of near-IR radiation facilitates use of a wide range of organic and inorganic absorption compounds and, in particular, semiconductive and conductive types.

To appreciate the innovations of the present invention, it is important to recognize the mechanism by which pumped crystals lase. A suitable crystal is generally a flat-flat monolith of "thermal lensing" material; optical power delivered to one end face causes this and the opposed face to deflect in a bowing fashion (in the region of the incident pumping radiation), creating a resonator cavity that facilitates the self-reinforcing reflections characteristic of laser output. Although thermal lensing is required for the crystal to lase, excessive thermal lensing (as well as bulk lensing of the entire crystal unrelated to resonant behavior) results in inefficient operation as well as multiple output modes. To create a smooth imaging spot, it is desirable to obtain a single transverse mode of operation (preferably the lowest-order, fundamental $TEM_{00}$ mode—i.e., a Gaussian beam profile), with the output divergence as close as possible to that of a diffraction-limited source.

One source of dot-size variation, it has been found, is poor thermal management. Since the energy emitted by a pumped crystal is always less than the incident energy from the pumping source, heat is necessarily generated, and this heat contributes to excessive lensing if not removed. Typically, the crystal is bonded within a thermally conductive (usually metal) mount by an adhesive such as a fluorosilicone. Because the coefficients of thermal expansion and heat transmission are very different for the polymeric adhesive and the metal mount, however, heat is poorly conducted away from the crystal. Moreover, the different rates of expansion can result in imperfect contact between the adhesive and the mount, further compromising heat removal.

In addition, the adhesive is typically applied only to the exterior edges of the crystal. The crystal faces ordinarily rest against the walls of the mount. Once again, because of the mismatch in thermal conductivities, heat transport is reduced.

Accordingly, in a first aspect, the invention improves upon conventional mounting arrangements by affixing the laser crystal to the mount using materials whose coefficients of thermal expansion and heat transmission substantially match those of the mount. In a preferred embodiment, the laser crystal is received within a recess of larger transverse dimension, and the resulting void area is filled with solder having the appropriate thermal characteristics. In addition, at least one face of the crystal is metalized so as to afford thermal compatibility with contacted portions of the mount.

In a second aspect, the thickness of the laser crystal—that is, the depth of the laser cavity—is chosen so as to minimize variations in spot size as the duty cycle is altered. Although the need for resonance behavior to induce lasing substantially limits the range of acceptable thicknesses, it has nonetheless been found that an ideal thickness (or small range of thicknesses) exists within this range. Deviations from the ideal thickness lead to more pronounced relationships between spot size and duty cycle.

In a third aspect, the doping level of the crystal has also been found to affect this relationship. Laser crystals are generally doped with a rare earth element such as neodymium (Nd), and it is this element, when embedded within crystal substrates such as $YVO_4$, YLF or YAG, that actually causes lasing upon appropriate excitation. Once again, the range of acceptable dopant concentrations is constrained by the requirements of effective laser performance, but an ideal concentration (or small range of concentrations) can usually be identified.

A fourth aspect of the invention concerns the housing structure for the crystal and associated optics. The crystal mount may be a generally cylindrical housing received within a thermally matched focusing element. When mated, these components retain the crystal and afford heat dissipation; a lens fixed within the focusing element directs pumping radiation onto the crystal face. Radiation from the pumping laser enters the focusing element by means of a direct connection to the laser, or, more typically, via a fiber-optic cable. Radiation emitted by the pumped crystal exits the crystal mount and passes through a barrel, which terminates in an optical arrangement that focuses the low-NA radiation for application to a recording construction. The elements of the housing structure fit together to establish the proper optical and mechanical relationships among the operative components contained therein.

In a related aspect, the invention provides a strategy for enhancing the amount of laser power coupled into a fiber-optic cable from the pumping source, and therefore available to stimulate the laser crystal.

The housing is usually mounted in a writing head, which may contain multiple such assemblies at evenly spaced intervals. A controller causes relative movement between the writing head and a recording medium, effectively scanning the laser or lasers over the surface, activating them at positions adjacent selected points or areas of the plate. The controller indexes the writing head, after completion of each pass across or along the printing member, a distance determined by the number of beams emanating from the head and by the desired resolution (i.e, the number of image points per unit length). The pattern of laser activation is determined by image signals, provided to the controller and corresponding to the original document or picture being copied onto the plate, to produce a precise negative or positive image of that original. The image signals are stored as a bitmap data file on a computer. Such files may be generated by a raster image processor (RIP) or other suitable means. For example, a RIP can accept input data in page-description language, which defines all of the features required to be transferred onto the printing plate, or as a combination of page-description language and one or more image data files. The bitmaps are constructed to define the hue of the color as well as screen frequencies and angles. The components of the invention can be located on a press, in which case the imaged plates are immediately ready for printing; or on a stand-alone plate-maker (or "platesetter"), in which case the imaged plates are removed and manually transferred to a press.

One persistent difficulty in the design of any focusing arrangement is two-dimensional alignment of the beam, so that the point at which it strikes the plate surface corresponds physically to the x,y location specified in the bitmap. To manufacture a housing and writing head with precision fittings that make proper alignment automatic would require considerable expense in fabrication and assembly. Instead, arrangements such as that shown in FIG. 1 have been employed. As illustrated therein, fiber-optic cable 10 terminates in an SMA (or similar) connector package 12, which includes a threaded collar 14 that is free to rotate. The focusing assembly 16 includes a threaded sleeve 18 that mates with hood 14; a first tubular housing segment 20; and a second housing segment 22. Sleeve 18 is secured to segment 20 by a nut 24, and is located off-center with respect to segment 20. In other words, the central axis of sleeve 18 is radially shifted with respect to the central axis of segments 20, 22, which define a single continuous bore 30 with an inner wall 31. Segments 20 and 22 are free to rotate with respect to one another, but may be locked into a desired torsional orientation by a pair of nuts 26, 28. segment 22 contains a pair of focusing lenses 32, 34 at its terminus.

Because sleeve 18 is located off-axis, the beam from cable 10 cannot pass through the center of bore 30; the beam axis always remains shifted with respect to the central axis of bore 30, and rotation of segments 20, 22 shifts the angular position of the optical or beam axis. The reason for this construction is shown in FIG. 2. Assume that a perfectly mounted focusing assembly 16 would have a central axis that passes through the origin of the x,y axes. Such perfection is both expensive and difficult to achieve in practice. Thus, suppose that the central axis 40 of a representative focusing assembly 16 is displaced with respect to the origin as illustrated. Due to the eccentricity in mounting, the beam will be even more displaced, as shown at 42. However, relative rotation of segments 20, 22 conveniently brings the beam into horizontal alignment (i.e., intercepting the y-axis), and simple timing adjustments can ordinarily be used to compensate for the resulting vertical offset. For example, in a drum configuration, where the beam focuses onto the surface of a rotating printing member, resulting in relative movement along the y-axis, the effective origin can be shifted merely by advancing or delaying the moment of laser activation; if an image dot is to be written onto the origin, the laser controller waits for the true origin on the printing member to reach adjacency with the offset position of the beam before firing the laser.

While suitable for many applications, the foregoing design nonetheless exhibits certain design shortcomings. Even a perfectly centered laser beam emanating into bore 30 can diverge and strike the inner wall 31, producing ghost reflections of various diameters in the focal plane. The eccentricity of the optical axis exacerbates this problem, since the outer rays strike wall 31 sooner, resulting in additional interactions. Indeed, since the beam dispersion must be sufficient to ensure adequate energy through the central axis despite off-axis emission, such reflections are largely unavoidable. Still further interactions can result from the reflection of the beam back into bore 30 and off the inner face of the rear wall of segment 20. The asymmetry of all these interactions results in shadowing and ghost reflections, the ultimate result of which is unwanted, spurious energy at the focal plane that causes, among other things, inaccurate power readings during alignment.

An alternative arrangement, illustrated in U.S. Ser. No. 08/602,881 (filed on Feb. 16, 1996 and entitled APPARATUS FOR LASER-DISCHARGE IMAGING AND FOCUSING ELEMENTS FOR USE THEREWITH, the entire disclosure of which is hereby incorporated by reference) utilizes optics to correct for horizontal beam displacement; that is, the focusing lens can focus off-axis, so that the beam path is slightly off-center, and horizontal displacement is attained through rotation of the lens. This arrangement, of course, requires specialized optics.

In accordance with a sixth aspect of the invention, the housing includes a cartridge having a radially displaced (i.e., eccentric) bore. The beam-focusing optics fit into the cartridge, which does not affect the beam path; that is, the beam stays on-axis through the focusing optics, so that conventional lenses may be used. The cylindrical cartridge is received within the writing head, and rotation of the housing/cartridge assembly with respect thereto results in horizontal beam displacement due to the radial eccentricity of the cartridge bore.

The present invention is usefully applied to environments other than printing. Virtually any application requiring a high-frequency, collimated laser beam can benefit from the various approaches described herein. Such applications include cutting, soldering, medical therapies, etc.

BRIEF DESCRIPTION OF THE DRAWINGS

The foregoing discussion will be understood more readily from the following detailed description of the invention, when taken in conjunction with the accompanying drawings, in which:

FIG. 12 is an exploded view of an alternative implementation of the invention;

FIGS. 13A and 13B are elevational and sectional views, respectively of the lens housing shown in FIG. 12;

FIG. 13C is another sectional view of the housing taken along the line 13C—13C;

FIGS. 14A, 14B and 14C are exploded, end and sectional plan views, respectively, of the crystal housing shown in FIG. 12;

DETAILED DESCRIPTION OF THE PREFERRED EMBODIMENTS

Figure 3:
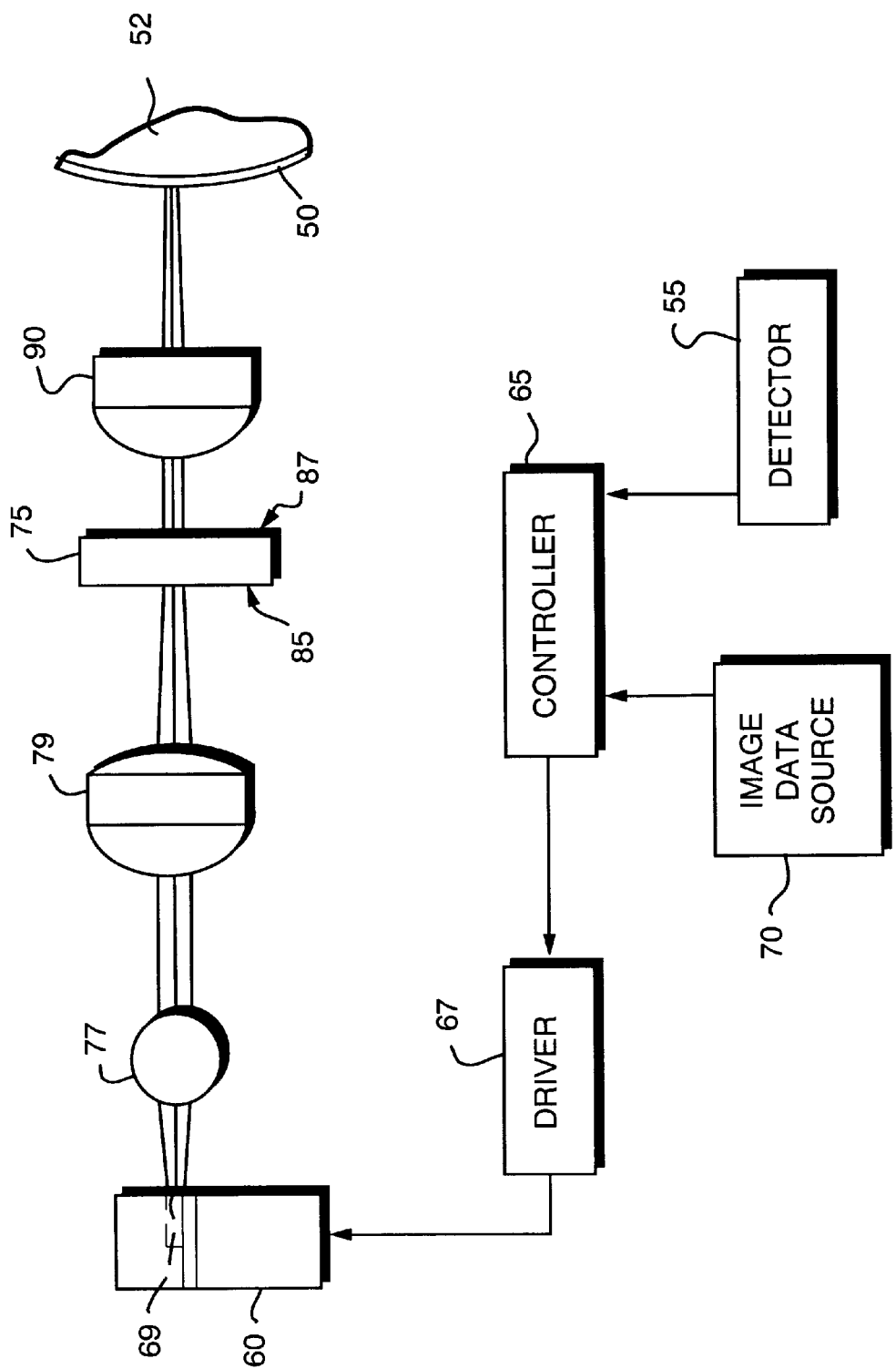
FIG. 3 schematically illustrates the basic components of the invention as implemented in a representative environment.

Refer first to FIG. 3, which schematically illustrates the basic components of an environment to which the invention may be applied. A recording medium 50, such as a lithographic plate blank or other graphic-arts construction, is affixed to a support during the imaging process. In the depicted implementation, that support is a cylinder 52, around which recording medium 50 is wrapped. If desired, cylinder 52 may be straightforwardly incorporated into the design of a conventional lithographic press, serving as the plate cylinder of the press. Cylinder 52 is supported in a frame and rotated by a standard electric motor or other conventional means. The angular position of cylinder 52 is monitored by a shaft encoder associated with a detector 55. The optical components of the invention, described hereinbelow, may be mounted in a writing head for movement on a lead screw and guide bar assembly that traverses recording medium 50 as it rotates. Axial movement of the writing head results from rotation of a stepper motor, which turns the lead screw and indexes the writing head after each pass over cylinder 52.

Imaging radiation, which strikes recording medium 50 so as to effect an imagewise scan, originates with one or more pumping laser diodes 60. The optical components discussed below concentrate the entire laser output onto recording medium 50 as a small feature, resulting in high effective power densities. A controller 65 operates a laser driver 67 to produce an imaging burst when the output slit 69 of laser 60 reaches appropriate points opposite recording medium 50; as discussed in the '470 application, laser 60 may otherwise be maintained at a baseline, non-imaging energy level to minimize switching time. The driver preferably includes a pulse circuit capable of generating at least 40,000 laser-driving pulses/second, with each pulse being relatively short, i.e., on the order of microseconds.

Controller 65 receives data from two sources. The angular position of cylinder 52 with respect to the laser output is constantly monitored by detector 55, which provides signals indicative of that position to controller 65. In addition, an image data source (e.g., a computer) 70 also provides data signals to controller 65. The image data define points on recording medium 50 where image spots are to be written. Controller 65, therefore, correlates the instantaneous relative positions of laser 60 and recording medium 50 (as reported by detector 55) with the image data to actuate the appropriate laser drivers at the appropriate times during scan of recording medium 50. The driver and control circuitry required to implement this scheme is well-known in the scanner and plotter art; suitable designs are described in the '092 patent and in U.S. Pat. No. 5,174,205, both commonly owned with the present application and hereby incorporated by reference.

The output of laser 60 pumps a laser crystal 75, and it is the emission of crystal 75 that actually reaches the recording medium 50. A series of lenses 77, 79 concentrate the output of laser 60 onto an end face 85 of crystal 75. Radiation disperses as it exits slit 69 of laser 60, diverging at the slit edges. Generally the dispersion (expressed as a "numerical aperture," or NA) along the short or "fast" axis shown in FIG. 3 is of primary concern; this dispersion is reduced using a divergence-reduction lens 77. A preferred configuration is a completely cylindrical lens, essentially a glass rod segment of proper diameter; however, other optical arrangements, such as lenses having hemispheric cross-sections or which correct both fast and slow axes, can also be used to advantage.

A focusing lens 79 focuses radiation emanating from lens 77 onto end face 85 of laser crystal 75. The optical path between lenses 77 and 79 may be direct, or may instead proceed through a fiber-optic cable. Lens 79 may be a bi-aspheric lens (see, e.g., the '881 application). Generally, end faces 85, 87 have mirror coatings that limit the entry of radiation other than that originating from the pumping source, and trap the output radiation. In this way, the two coatings facilitate the internal reflections characteristic of laser amplification while preventing the entry of spurious radiation. In one embodiment, each face 85, 87 is provided with an HR coating that produces >99.8% reflection of 1064 nm (output) radiation and 95% transmission of 808 nm (input) radiation, and an R coating that produces 95% (±0.5%) reflection of 1064 nm radiation and >95% transmission of 808 nm radiation.

The highly collimated, low-NA output of crystal 75 is, finally, focused onto the surface (or an appropriate inner layer) of recording medium 50 by a lens 90, which may be a plano-convex lens (as illustrated) or other suitable optical arrangement. The laser, laser crystal and optical components are normally carried in a single elongated housing. Recording medium 50 responds to the imaging radiation emitted by crystal 75, e.g., through ablation of an imaging layer or by non-ablative transfer of material from a donor to an acceptor sheet.

The function of laser crystal 75 is to produce a low-NA laser output without excessive loss of energy from laser 60; essentially, the lost energy represents the price of increased depth-of-focus. Generally, crystal 75 is preferably (although not necessarily) a flat-flat monolith of "thermal lensing" material; optical power delivered to end face 85 causes faces 85, 87 to deflect in a bowing fashion, creating a resonator cavity that facilitates lasing. To create a smooth imaging spot, it is desirable to obtain a single transverse mode of operation (preferably the lowest-order, fundamental $TEM_{oo}$ mode), with the output divergence as close as possible to that of a diffraction-limited source.

Figure 4:
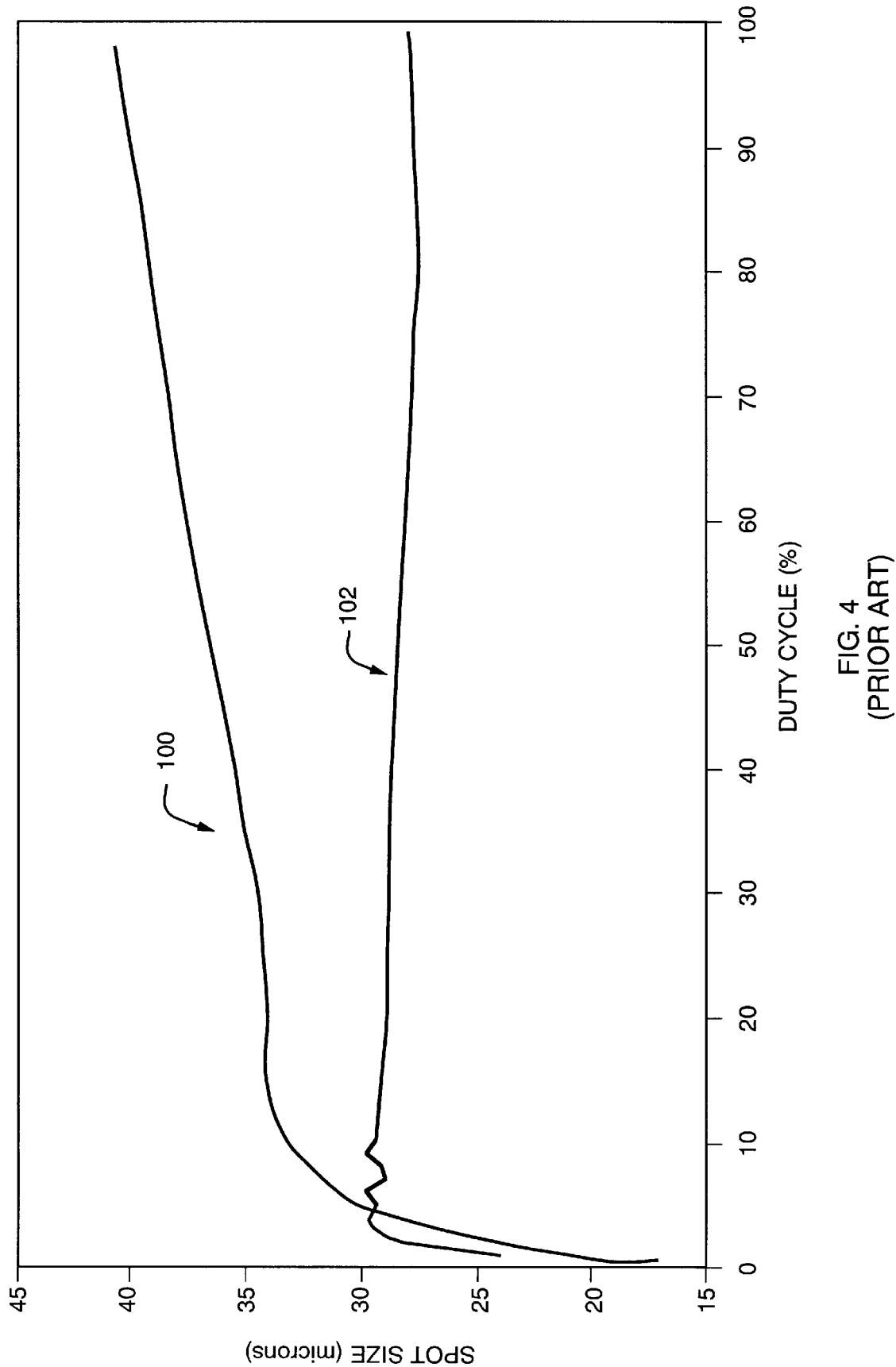
FIG. 4 shows the variation in spot size with duty cycle in a conventional (prior art) laser-crystal arrangement.
Figure 5B:
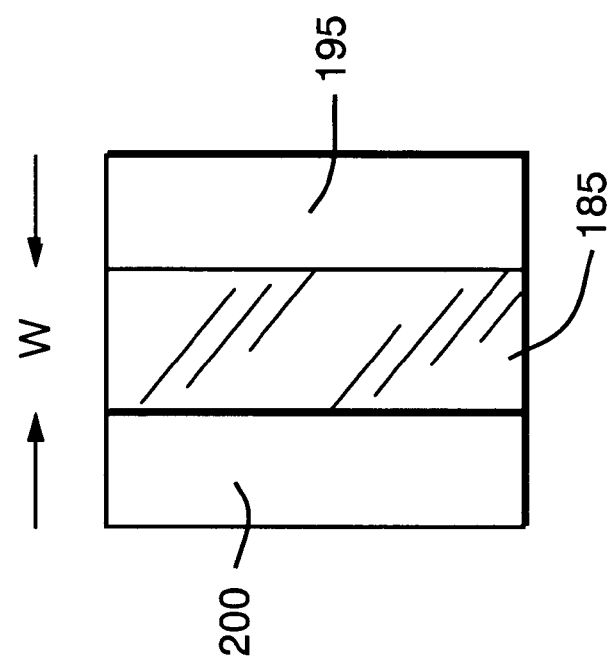
FIG. 5B is an elevational end view of the crystal shown in FIG. 5A.
Figure 5A:
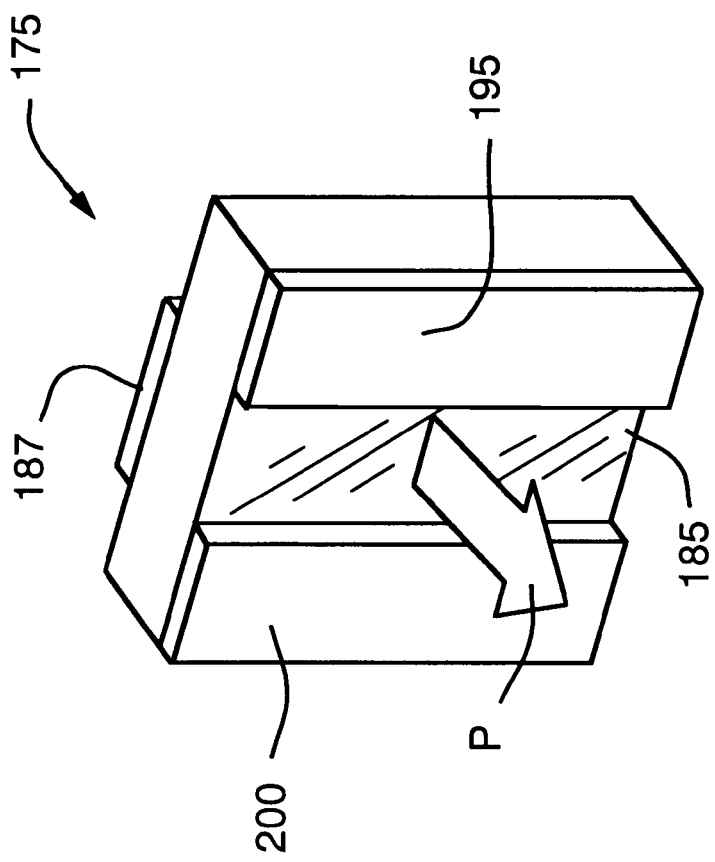
FIG. 5A is an isometric view of a laser crystal coated and metalized in accordance with the present invention.

The behavior of a conventionally operated laser crystal in the above-described arrangement is depicted in FIG. 4. The graph 100 illustrates variation of spot size with duty cycle for a 2 mm-thick, $Nd:YVO_4$ crystal doped to a 5% concentration, while the graph 102 illustrates this variation for a 1 mm crystal. In both cases, the spot size changes substantially at low duty cycles and gradually over the remainder of the range. These variations are sufficient to alter the printed tints signficantly relative to what would be expected (for a consistent spot size).

The components of a representative implementation of the invention, and the manner in which they may be applied to the arrangement schematically depicted in FIG. 3, are illustrated in FIGS. 5–10. First, as shown in FIGS. 5A and 5B, the laser crystal 175 is coated only partially with mirror coatings 185, 187; the width W of the mirror coatings is substantially larger than the beam from the pumping source, however, so all incident beam energy contributes to lasing. Crystal 175 is metalized alongside coating 185 to form a pair of metal-film pillars 195, 200. The pillars 195, 200 may be vacuum deposited onto crystal 195, and may consist of a 300 Å deposit of chromium and a 2400 Å deposit of gold. The plane of polarization of the crystal output is shown at P.

Figure 6:
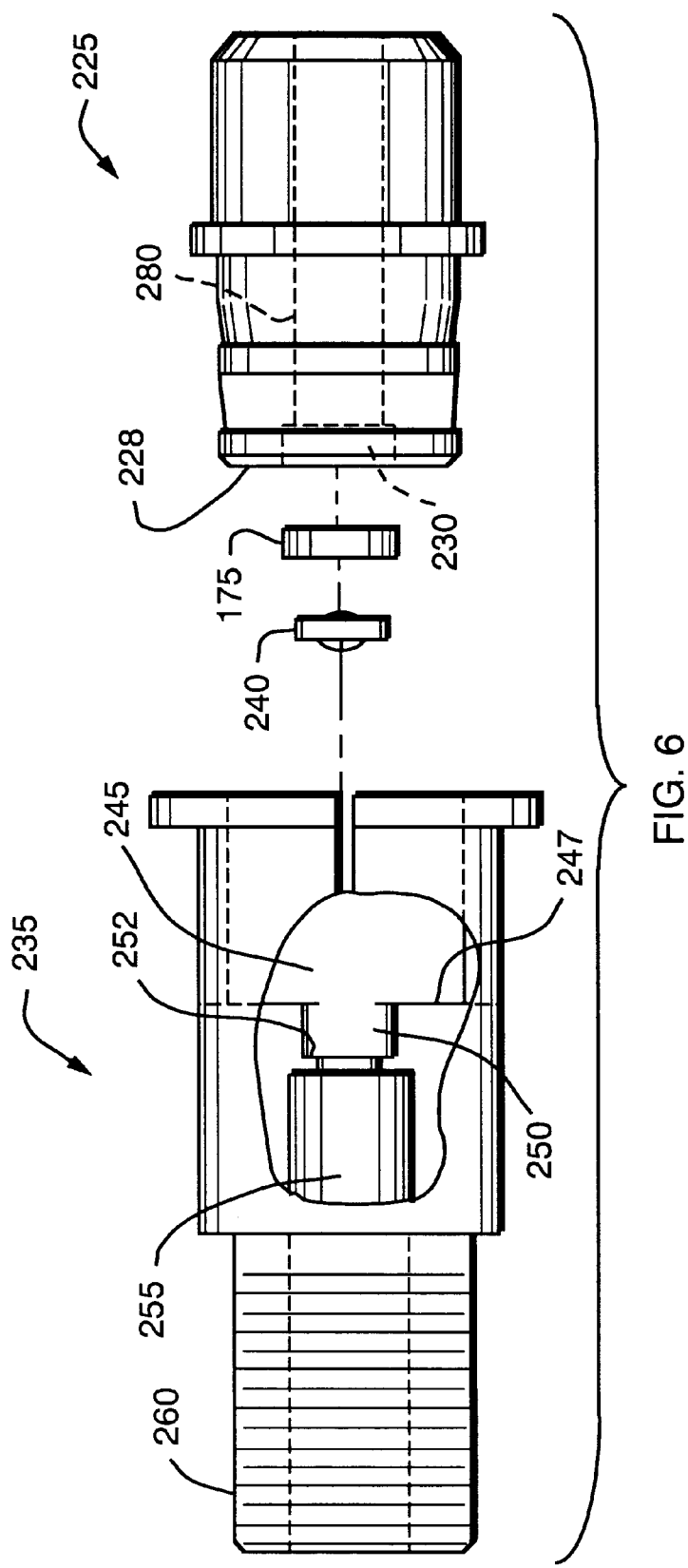
FIG. 6 is a partial-cutaway, exploded plan view of a two-piece mount for bearing and focusing radiation onto the crystal shown in FIGS. 5A, 5B.

As illustrated in FIG. 6, crystal 175 is received in a crystal housing cartridge 225, which contains a front face 228 having a recess 230 within which crystal 175 is affixed (as discussed further below). Cartridge 225 is itself received within a lens housing 235, which also retains a concentrating lens 240. The front portion of lens housing 235 includes a cylindrical channel 245, which terminates partially in a stop wall 247 having an open central aperture leading into a second, smaller cylindrical channel 250 which is itself partially terminated by a second stop wall 252. The still smaller concentric, cylindrical segment behind stop wall 252 widens into a longitudinal bore 255. The rear portion of lens housing 235 includes a tubular stem 260 having exterior threads, which is adapted to mate with a standard SMA connector. The source of pumping radiation is directed into a fiber-optic cable terminating in an SMA connector, and when such a connector is screwed onto stem 260, the fiber extends through bore 255 to approach the narrowest cylindrical segment connecting bore 255 to channel 250.

Figure 7:
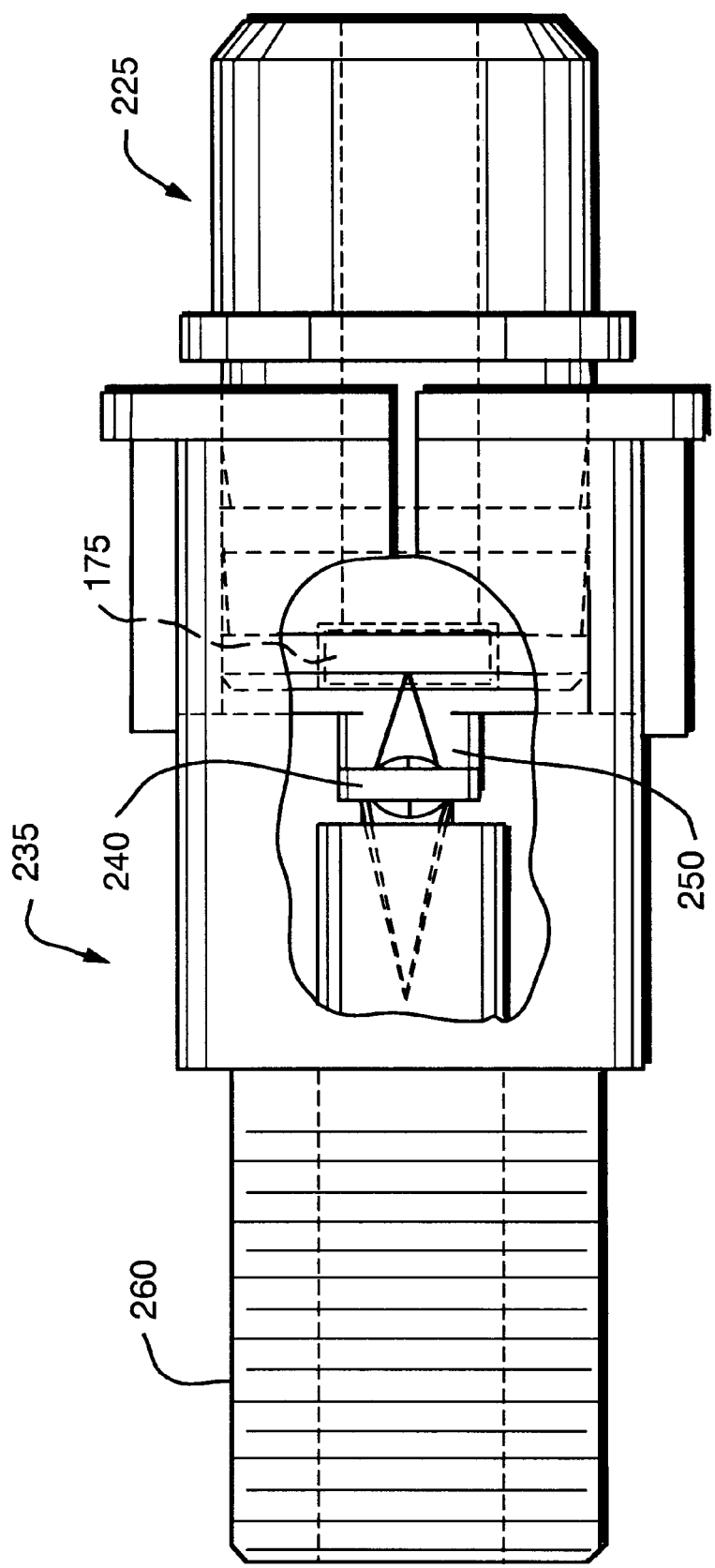
FIG. 7 is a partial-cutaway plan view of the two-piece mount shown in FIG. 6, with all components joined.

As shown in FIG. 7, lens 240 is received within channel 250 and is affixed to stop wall 252, and crystal 175 is received within recess 230. Cartridge 225 is received within channel 245 of lens housing 245 so that the front face 228 of cartridge 225 makes contact with the stop wall 247 of lens housing 235. (In FIG. 7, front face 228 is shown slightly displaced from stop wall 247 for clarity.) In this configuration, lens 240 focuses incoming pumping radiation onto the front face of crystal 175, which is retained against stop wall 247 such that pillars 195, 200 (see FIGS. 5A and 5B) make good mechanical contact with stop wall 247. Housings 225, 235 are preferably fabricated from a metal such as OFHC copper.

Figure 8:
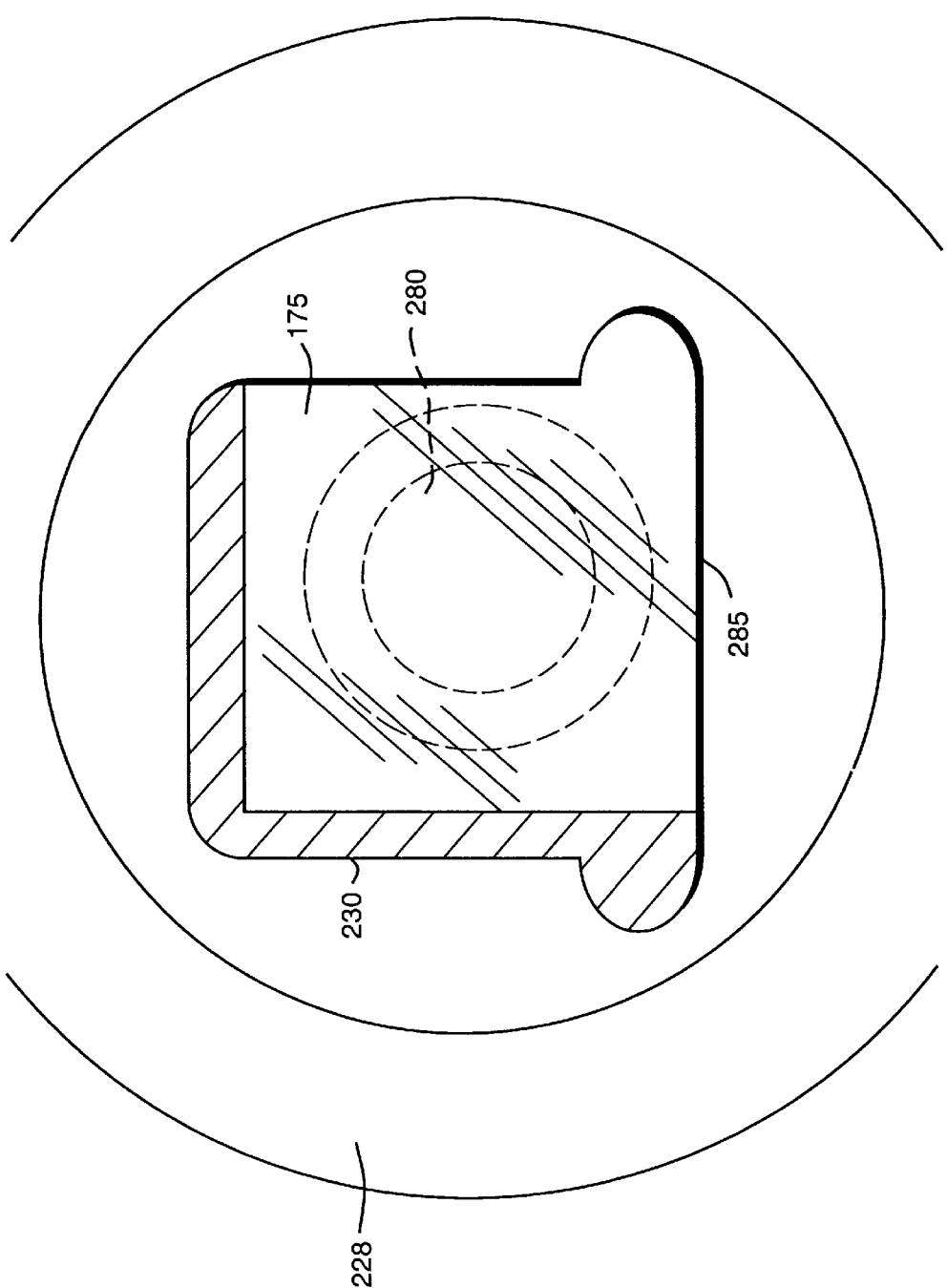
FIG. 8 is an end view of the crystal and crystal housing shown in FIG. 6.

Refer now to FIG. 8, which shows in greater detail the front face 228 of cartridge 225 and the manner in which crystal 175 is disposed therein. Front face 228 is generally flat except for recess 230. Beginning at recess 230 is a central longitudinal bore 280 that extends through cartridge 225. Recess 230 terminates below bore 280 to form a support shelf 285, and is slightly offset with respect to bore 280 such that, with edges of crystal 175 butted against shelf 285 and the right edge of recess 230, unoccupied space exists within recess 230 above and to the left of crystal 175.

To affix crystal 175 to cartridge 225 in a manner that affords substantially uninterrupted heat transfer, the crystal is placed within recess 230 with two cornered edges of crystal 175 abutting shelf 285 and a vertical edge of recess 230, so that crystal 175 is substantially centered over the entrance to bore 280. The unoccupied space within recess 230 is filled with solder having coefficients thermal expansion and heat transmission approximating those of housing 225. By "approximating" is meant within 10%, and preferably within 5%; in an absolute sense, the coefficient of thermal expansion of the solder must be such that the overall expansion experienced by the solder during use not exceed the amount of shear strain that the crystal can handle. As a result of the continuous thermal-transfer path from crystal 175 to the exterior of cartridge 225, heat is continually and efficiently dissipated from crystal 175, avoiding excessive thermal and bulk lensing and thereby reducing spot-size variation.

Particularly in conjunction with OFHC copper housings, the solder is preferably based on indium or an alloy or bimetallic thereof, such as indium/gold. Alternatively, lead/tin alloys can be used. The solder is applied using conventional dye-bonding techniques, and is surface-cleaned by chemical etching. Until housings 225, 235 are mated, all surfaces are preferably kept in an environment of inert gas to prevent oxidation.

Figure 9:
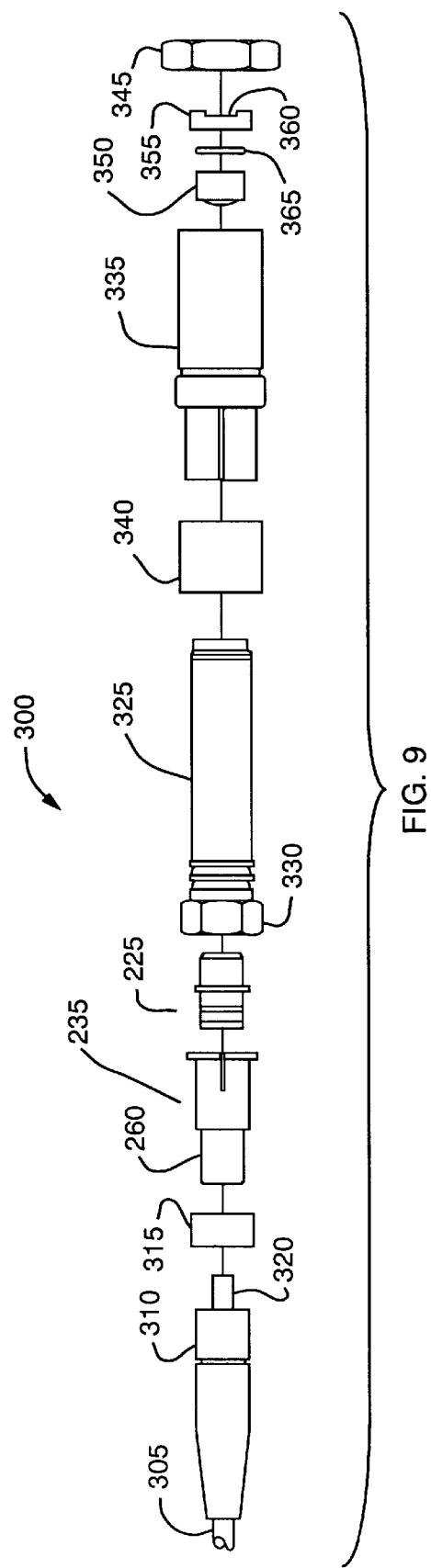
FIG. 9 is an exploded plan view of an entire housing and focusing assembly.
Figure 10:
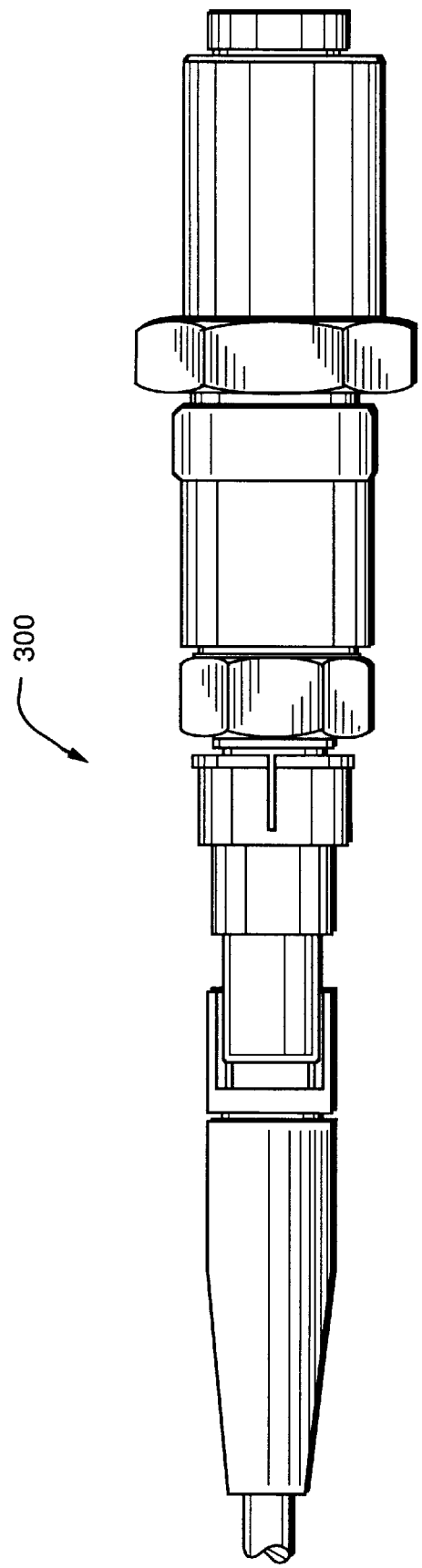
FIG. 10 is a partial cutaway plan view of the assembly shown in FIG. 9, with all components joined.

Refer now to FIGS. 9 and 10, which illustrate a complete focusing and housing assembly 300 in accordance with the present invention. Assembly 300 guides radiation from fiber-optic cable 305 to the imaging surface of a printing member (not shown, but disposed beyond the output end of assembly 300).

As shown in the figure, fiber-optic cable 305 terminates in an SMA connector assembly 310 including a threaded collar 310 screws onto tubular stem 260. A spacer 315 may be provided to ensure that a proper distance separates the output face 320 of fiber-optic cable 305 from concentrating lens 240 (not shown in FIG. 9 for simplicity). With crystal 175 secured within cartridge 225, and cartridge 225 received within lens housing 235, housing 235 is received within a first barrel segment 325. Lens housing 235 is secured to barrel segment 325 by a nut 330, and may be located off-center with respect to the bore 280 of cartridge 225 in order to facilitate mechanical alignment (as described, for example, in the '881 application). Barrel segment 325 is received concentrically within a second barrel segment 335, and extends substantially to the end thereof. Segments 325, 335 are joined by means of a spacing sleeve 340 and a nut 345, and the entire assembly may be cooled, if necessary, by air convention or circulating water.

A focusing and correction lens 350 as described, for example, in the '881 application, is housed within a retaining cap 355 that is itself fastened to the end of segment 335. Cap 355 includes a window 360 that exposes lens 350, and which has a diameter less than that of segment 325 (which, as shown in FIG. 10, actually surrounds lens 350 when fully received within segment 335). Lens 350 may be retained within cap 355 by means of an O-ring 365.

All interior surfaces of segments 325, 335 are preferably blackened (e.g., with Ebnol "C" black) to prevent reflection.

As noted earlier, since the thickness of crystal 175 determines the depth of the laser cavity, this parameter also affects variation in spot size as the duty cycle is altered; thicker crystals undergo greater degrees of thermal and bulk lensing, resulting in greater output variation. For a Nd:YVO$_4$ crystal, for example, a thickness of 0.75 mm has been found to be optimal.

Optimizing the doping level of the crystal also reduces spot-size variation. Typically, the minimal doping level necessary for adequate laser performance proves ideal. In a Nd:YVO$_4$ crystal, doping levels below 1% provide insufficient energy conversion for lasing; but levels ranging from 1% to 1.12% have been found to facilitate lasing with minimal variation in spot size.

Figure 11:
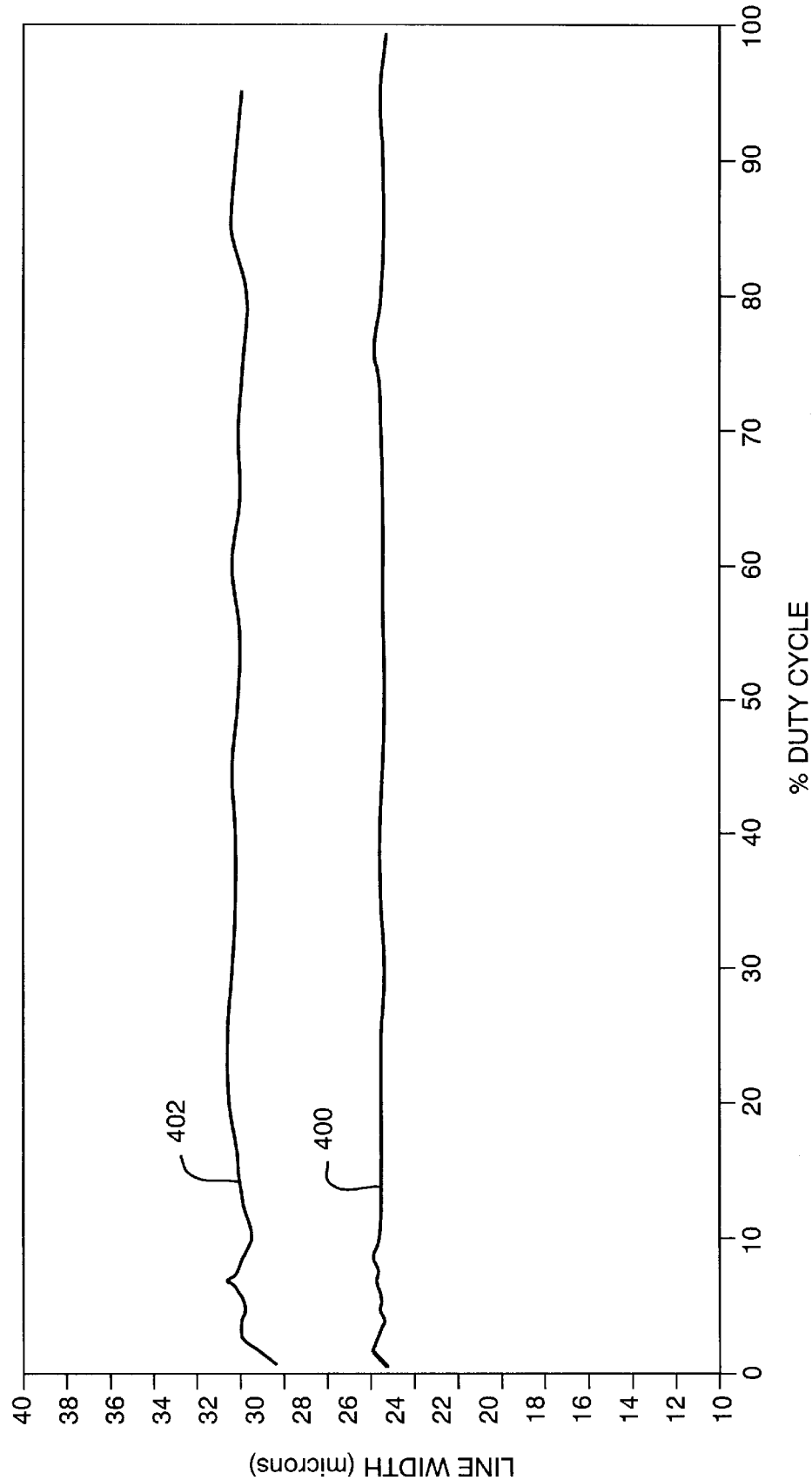
FIG. 11 graphically depicts the variation in spot size with duty cycle obtained in accordance with the present invention.

FIG. 11 illustrates the combined effects of the thermally matched mounting assembly described above, and use of a 1%-doped, 0.75 mm thick Nd:YVO$_4$ laser crystal with two different types of mirror coatings. The curve 400 illustrates the effects of a single-pass coating: spot-size variation is held to within one micron over the entire range of duty cycles. (For purposes hereof, a range of spot sizes within 2% of the average or target spot size is considered a substantially constant spot size.) Curve 402 reveals that use of a double-pass coating increases spot-size variation at duty cycles below 15%; at higher duty cycles, variation also remains within approximately one micron.

An alternative housing arrangement is illustrated in FIGS. 12–17. As shown generally in FIG. 12, the arrangement comprises a lens housing 500; a crystal housing 502; a focusing barrel 504; and a retention cartridge 506 terminating in a collet and secured to barrel 504 by a collet nut 510.

The elements of lens housing 500 are shown in greater detail in FIGS. 13A–13C. The front portion of housing 500 has a collar 520 that surrounds a cylindrical channel 525 in which a concentrating lens (e.g., an aspheric lens) 527 is received. Channel 525 terminates in a stop wall 529 having an open central aperture leading into a second, smaller cylindrical channel that itself widens into a longitudinal bore 532. When received within channel 525, the outer margin of lens 527 is retained against stop wall 529 by an elastomeric O-ring 537, which, in turn, is secured by a cap 540 that is force-fitted over collar 520.

The rear portion of lens housing 500 includes a tubular stem 534 having exterior threads (see FIG. 13B) or other mounting hardware for accepting a fiber-optic cable connector. When such a connector is affixed to stem 534, the fiber extends through bore 532 to approach the smaller cylindrical channel separating bore 532 from channel 525.

Housing 500 contains additional bores for receiving various alignment and mounting elements. In particular, a second longitudinal bore 545 is displaced radially from bore 532 and extends through the body of housing 500. Bore 545 receives a set screw 547 (see FIG. 12) and contains a series of internal threads for this purpose. Two more longitudinal bores 550a, 550b (see FIG. 13C) extend through the body of housing 500 for receiving a pair of alignment pins associated with crystal housing 502 (as discussed below). Finally, a lateral bore 552 extends laterally through housing 500 but is displaced from the central axis, and so runs between (and perpendicular to) bores 550a, 552. With reference to FIG. 12, lateral bore 552 receives a jam collar 555 and a jam nut 557, the former having a smooth interior and the latter having internal threads. Collar 555 and nut 557 each have an external bevel. With alignment pins extending through channels 550a, 550b, collar 555 is introduced into the top of bore 552 and nut 557 into the bottom of the bore. A cap screw 560 passes through collar 555 and threads into nut 557. As screw 560 is tightened, the bevels of collar 555 and nut 557 wedge against the alignment pin passing through bore 550a. Prior to tightening screw 560, set screw 547 is adjusted to establish a desired displacement between lens housing 500 and crystal housing 502.

Refer now to FIGS. 14A–14C, which show crystal housing 502 in greater detail. Crystal housing 502 has a front face 570 that is generally flat except for a channel 572 that contains a further recess 574. As described in connection with FIG. 8 above, recess 574 contains a support shelf and receives the crystal 576 (and, if necessary, a preform crystal mount 578).

Housing 502 also contains a pair of oppositely disposed recesses 580a, 580b that each receive a dowel pin 582a, 582b. These serve as the alignment pins described above, and the segment of pins 582a, 582b projecting beyond face 570 are received within bores 550a, 550b of lens housing 500. As best seen in the sectional plan view of FIG. 14C, beginning at recess 574 is a central longitudinal bore 585 that extends partway through housing 502 before widening into a channel 587, which itself extends to the the front face of housing 502.

Figure 15:
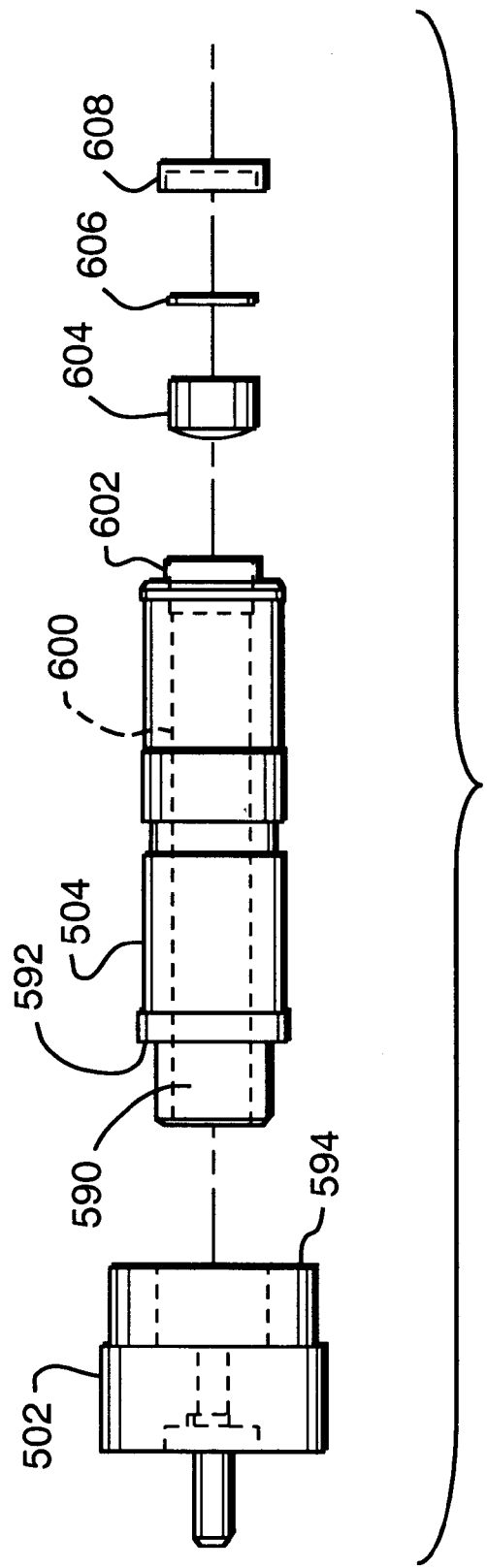
FIG. 15 is an exploded view of the lens barrel showing its engagement to the crystal housing.

FIG. 15 illustrates the components of lens barrel 504, which mates with crystal housing 502. In particular, barrel 504 has at its rear end a neck segment 590 that widens to form a shoulder 592. Neck segment 590 fits completely and snugly within the channel 587 of crystal housing 502; with neck segment 590 fully received, shoulder 592 abuts the front face 594 of crystal housing 502.

A longitudinal bore 600 extends fully through barrel 504, terminating in a collar 602 that defines the front end of barrel 504. A focusing lens 604, which may be a conventional aspheric lens, is received within bore 600 and is retained in place by an elastomeric O-ring 606 and a cap 608, which is force-fitted over collar 602. The length of barrel 504, and in particular bore 600, is dictated by the focal length of lens 604.

With renewed reference to FIG. 12, the entire length of lens barrel 504 is received within a wide longitudinal bore 620 running through retention cartridge 506. The front end of cartridge 506 is divided into arcuate segments to form a collet, and contains a series of exterior threads 625 that engage collet nut 510. Accordingly, with barrel 504 received within cartridge 506, tightening of collet nut 510 over threads 625 secures barrel 504 into cartridge 506 by compression, preventing rotation or translation of the barrel.

Figure 16:
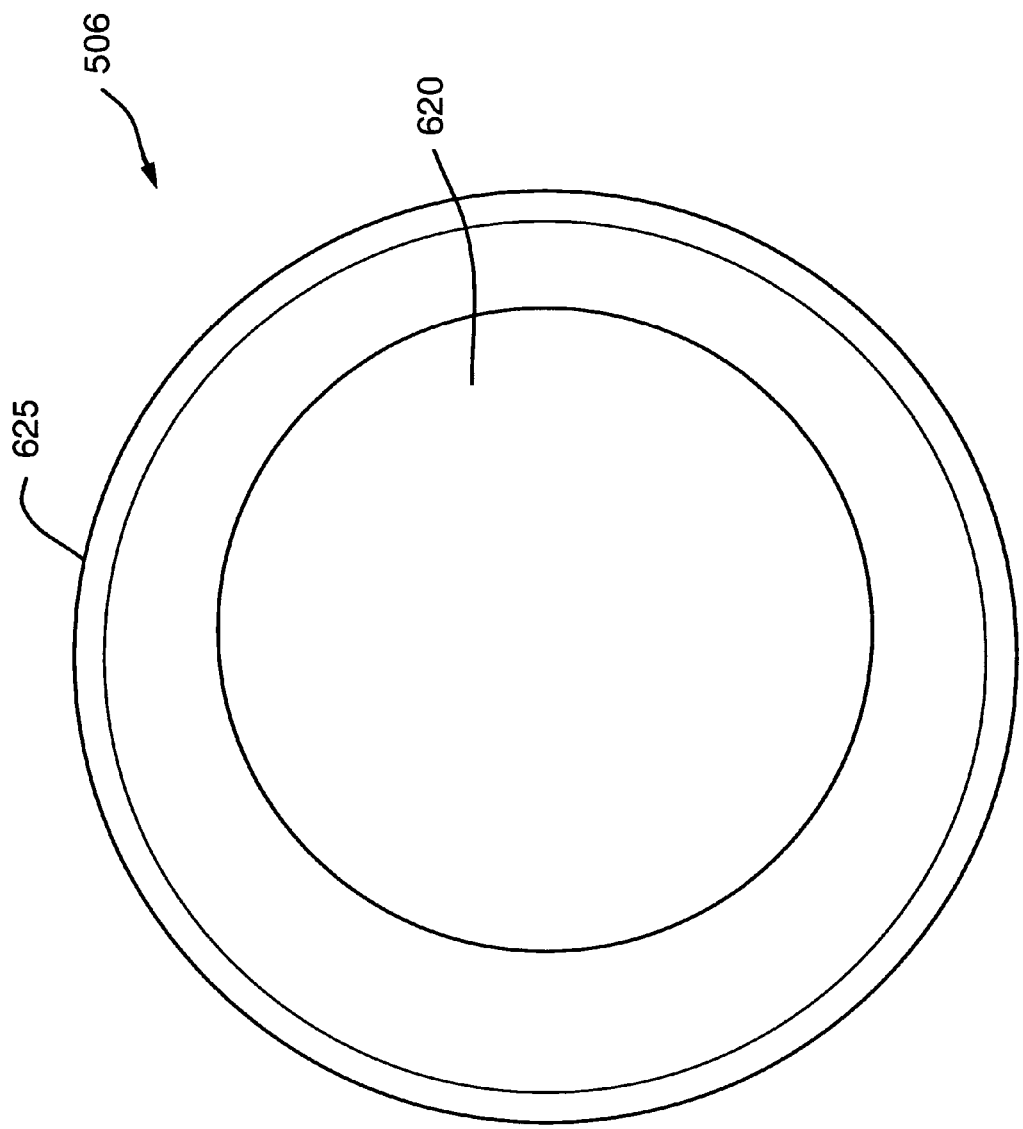
FIG. 16 is an end view of the retention cartridge shown in FIG. 12.
Figure 17:
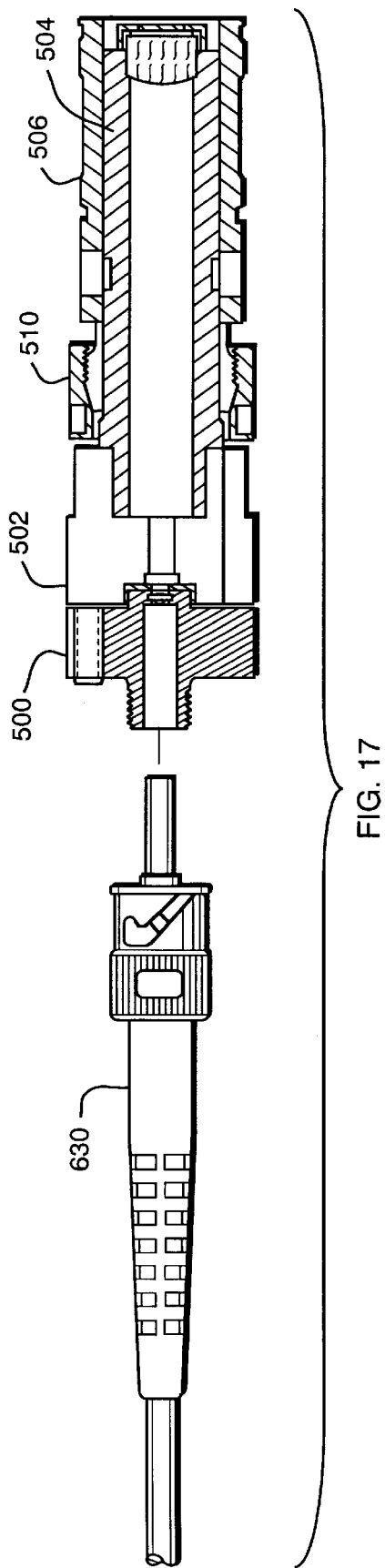
FIG. 17 is a sectional view of the assembled components shown in FIG. 12.

As shown in FIG. 16, which depicts the rear end of cartridge 506, the bore 620 is displaced slightly relative to the central axis. With all components of the assembly joined as shown in FIG. 17, the assembly is fitted within a writing head, and rotated until the beam reaches its proper horizontal position with respect to an opposed plate support; the assembly is then secured within the writing head (e.g., by locking means disposed within the writing head and which, when engaged, prevents movement of the assembly). In this way, the present assembly design allows all constituents to remain secured to one another even during horizontal placement of the laser beam, since it is the entire assembly (rather than a particular component) that is rotated.

Figure 1:
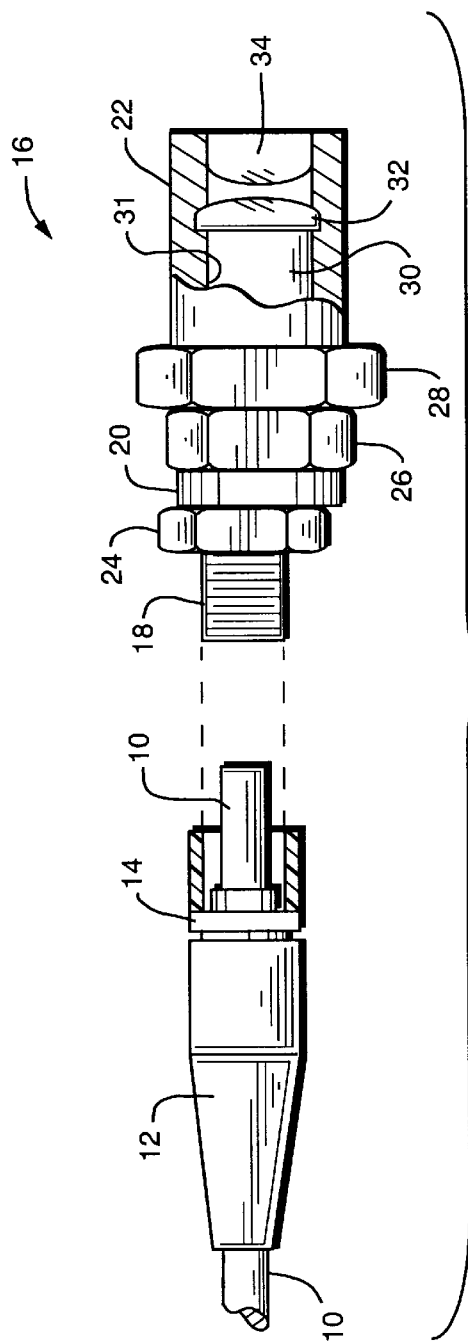
FIG. 1 is a partial cutaway elevation of a prior-art focusing device.
Figure 2:
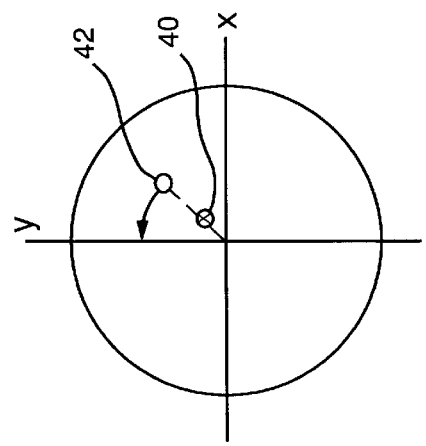
FIG. 2 schematic depicts correction of beam displacement from a true position.
Figure 18:
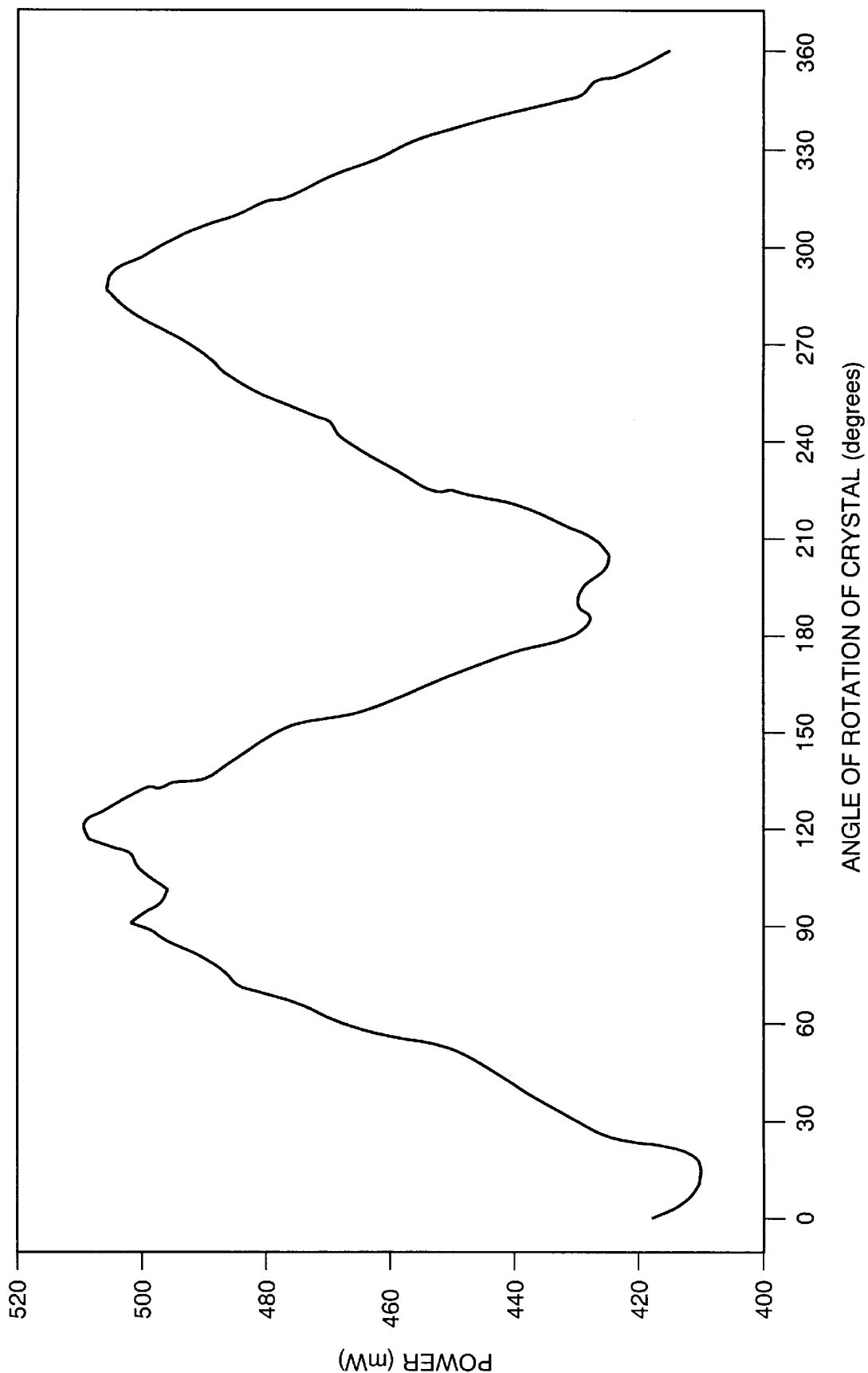
FIG. 18 graphically depicts the dependence of output power on polarization consistency between the pumping source (provided, e.g., over a fiber-optic cable) and the laser crystal.

In the '881 application, a number of strategies were discussed for maximizing the power transferred from the laser to the fiber-optic cable and, ultimately, to the laser crystal. It has been found that power can be lost through mismatch between the polarization of the radiation emitted from the fiber-optic cable and the natural polarization of the laser crystal. This is shown graphically in FIG. 18. When the planes of polarization are aligned, as occurs twice in a 360° rotation, power output is maximized. Thus, it is preferable to avoid engagement of the fiber-optic cable connector to the lens-and-crystal assembly without regard to power output. Instead, the connector should first be fitted loosely and the power output measured (using suitable beam-analysis equipment) as the fiber is rotated; the connector is then affixed (e.g., by rotation as shown in FIG. 1, or, if a locking connector package—such as an ST connector 630 as shown in FIG. 17—is used, through engagement of the locking mechanism).

It will therefore be seen that the foregoing approaches to packaging and design substantially enhance pumped-crystal laser performance. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for imaging a laser-responsive recording construction, the apparatus comprising:
   a. a radiation pumping source;
   b. a laser crystal, responsive to the pumping source, for producing low-dispersion radiation;
   c. means for focusing the radiation from the crystal onto a recording surface;
   d. means for operating the pumping source so as to produce, on the recording construction, an imagewise pattern of spots, the spots having a size and an application density, the spot size remaining substantially constant over a range of application densities.

2. The apparatus of claim 1 wherein the range of application densities is 1% to 100% and the spot size varies by no more than 2%.

3. The apparatus of claim 1 further comprising means for bearing the laser crystal, the bearing means comprising:
   a. a thermally conductive mount, the mount having coefficients of thermal expansion and heat dissipation;
   b. means for thermally coupling the laser crystal to the mount, the coupling means having coefficients of thermal expansion and heat dissipation approximating those of the mount.

4. The apparatus of claim 3 wherein the laser crystal comprises at least two sides in contact with the mount, the coupling means comprising a metal film disposed on at least one of the contacting sides for contact with the mount.

5. The apparatus of claim 4 wherein the housing material is oxygen-free-high-conductivity copper and film comprises chromium and gold.

6. The apparatus of claim 4 wherein the laser crystal further comprises two sides not in contact with the mount, the coupling means further comprising solder thermally coupling the non-contacting sides to the mount.

7. The apparatus of claim 6 wherein the housing material is oxygen-free-high-conductivity copper and the solder comprises indium.

8. The apparatus of claim 6 wherein the housing material is OFHC copper and the solder is an indium/tin alloy.

9. The apparatus of claim 6 wherein the housing material is OFHC copper and the solder is a lead/tin alloy.

10. The apparatus of claim 3 further comprising means for conducting heat from the mount.

11. The apparatus of claim 1 wherein the laser crystal comprises a dopant present in a concentration ranging from 1 to 1.12%.

12. The apparatus of claim 11 wherein the dopant is Nd.

13. A method of fabricating a pumped laser-crystal device exhibiting minimal spot-size variation with increasing duty cycle, the method comprising the steps of:
   a. providing a laser crystal, responsive to a pumping source, for producing output radiation;
   b. providing a housing for the laser crystal, the housing including means facilitating emission of a beam of output radiation from the crystal to focus onto a recording medium, the output producing image spots having sizes dependent on beam diameter and power density; and
   c. disposing the crystal within the housing so as to provide a substantially consistent thermal path from the crystal to the housing, exposure of the crystal to the pumping source producing output radiation which, when focused onto the recording medium produces spots having a size that remains substantially constant over a range of exposure frequencies.

14. The method of claim 13 wherein the laser crystal has a thickness minimizing variation of spot size over the range of exposure frequencies.

15. The method of claim 14 wherein the laser crystal requires a minimum thickness to produce output radiation, the crystal thickness being approximately equal to, but no less than, the minimum thickness.

16. The method of claim 15 wherein the laser crystal is $Nd:YVO_4$ and the thickness is approximately 0.75 mm.

17. The method of claim 13 wherein the laser crystal has a doping level minimizing variation of spot size over the range of exposure frequencies.

18. The method of claim 17 wherein the laser crystal requires a minimum thickness to produce output radiation, the doping level being approximately equal to, but no less than, the minimum level.

19. The method of claim 18 wherein the laser crystal is $Nd:YVO_4$ and the doping level rangers from 1% to 1.12%.

20. Apparatus for collimating and focusing laser radiation, the apparatus comprising:
   a. a receptacle for connection to a radiation pumping source;
   b. a laser crystal, responsive to the pumping source, for producing low-dispersion radiation, the crystal having an input side and an output side;
   c. means for retaining the laser crystal;
   d. a lens for concentrating radiation received at the receptacle onto the input side of the laser crystal;
   e. a focusing lens having a focal length for focusing radiation emanating from the output side of the crystal onto a recording medium; and
   f. a barrel extending between the output side of the laser crystal and the focusing lens, the barrel having a length determined by the focal length of the focusing lens,
   the receptacle, laser-crystal retention means, and barrel interfitting to create a continuous optical path extending through the receptacle, the concentrating lens, the laser-crystal re-tention means, the barrel, and the focusing lens.

21. The apparatus of claim 20 wherein the concentrating lens is an aspheric lens.

22. The apparatus of claim 20 wherein the focusing lens is an aspheric lens.

23. The apparatus of claim 20 further comprising a cartridge configured to fit securably within a writing head, the cartridge comprising:
   a. an elongated body having a central axis therethrough;
   b. a bore extending longitudinally through the body for receiving the barrel, the bore being radially displaced from the axis; and
   c. means for torsionally locking the received barrel within the cartridge.

24. The apparatus of claim 23 wherein the torsional locking means comprises a collet on the cartridge and a collet nut fitting thereover.

25. The apparatus of claim 20 wherein the receptacle, the concentrating lens, the laser-crystal retention means, the barrel, and the focusing lens are secured to one another to prevent rotation or translation thereamong.

26. The apparatus of claim 20 wherein the means for retaining the laser crystal comprises:
   a. a thermally conductive mount, the mount having coefficients of thermal expansion and heat dissipation; and b. means for thermally coupling the laser crystal to the mount, the coupling means having coefficients of thermal expansion and heat dissipation approximating those of the mount.

27. A method of focusing laser radiation onto a recording medium, the method comprising:
   a. providing a radiation pumping source;
   b. providing a laser crystal, responsive to the pumping source, for producing low-dispersion radiation having a polarization angle;
   c. providing means for conducting radiation from the pumping source to the laser crystal, the radiation emanating from the conducting means having a polarization angle;
   d. aligning the polarization angles; and
   e. focusing the radiation from the crystal onto the recording medium.

* * * * *